R. G. LEDIG.
SEAT FOR TRICYCLES OR LIKE VEHICLES.
APPLICATION FILED NOV. 14, 1917.
1,262,524.  
Patented Apr. 9, 1918.
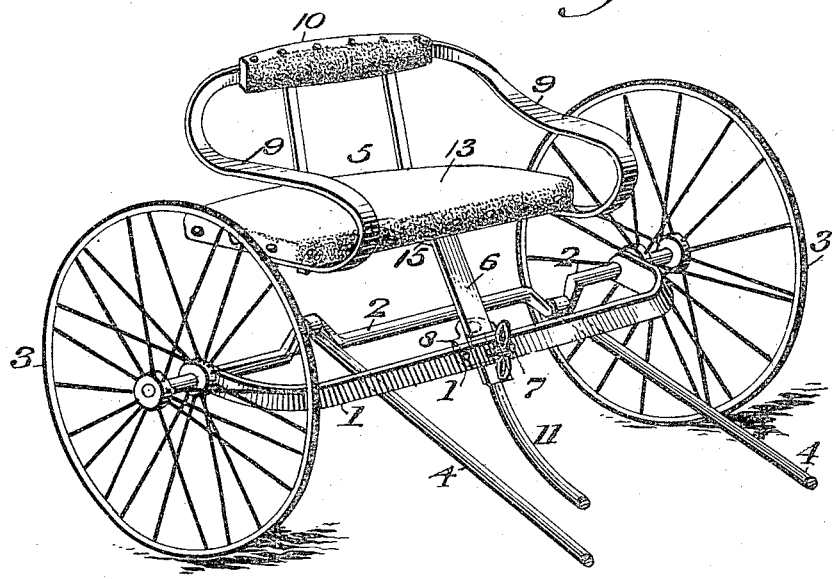
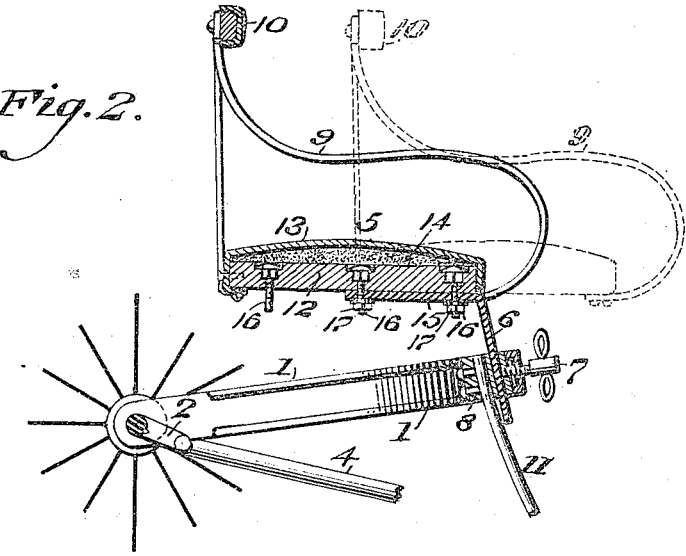
INVENTOR  
Richard G. Ledig  
BY Diedersheim + Fairbanks  
ATTORNEYS

UNITED STATES PATENT OFFICE.

RICHARD G. LEDIG, OF PHILADELPHIA, PENNSYLVANIA.

SEAT FOR TRICYCLES OR LIKE VEHICLES.

1,262,524.  Specification of Letters Patent.  Patented Apr. 9, 1918.

Application filed November 14, 1917. Serial No. 201,893.

*To all whom it may concern:*

Be it known that I, RICHARD G. LEDIG, a citizen of the United States, residing in the city and county of Philadelphia, State of Pennsylvania, have invented a new and useful Seat for Tricycles or like Vehicles, of which the following is a specification.

My invention relates to an improvement in the seat of a tricycle or similar vehicle, and consists in adapting the same to be adjusted in forward and rearward positions, as well as vertically, so that the pedals of the velocipede may be conveniently reached by the rider, the invention being hereinafter described as applied to a tricycle, it being satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a perspective view of the seat of a tricycle and appurtenances embodying my invention.

Fig. 2 represents a longitudinal vertical section thereof.

Fig. 3 represents a longitudinal vertical section of the seat and the member that supports the same, said member being in a different position from that shown in Fig. 2.

Similar numerals of reference indicate corresponding parts in the figures.

Referring to the drawings.

1 designates a cross bar of the running gear of a tricycle on the terminals of which is journaled the crank shaft 2, the terminals of which carry the wheels 3 of the tricycle, and on which are mounted the connecting rods 4 which latter are operated by foot pedals not shown. 5 designates the seat of the tricycle, the same having secured to the underside thereof the leg 6 which is connected with the cross bar 1 so as to be vertically movable thereon so as to adjust the height of said seat, said leg being held in position by the screw 7 which is fitted in the box 8 at the center of said cross bar and adapted to have its point tighten against said leg. 9 designates the arm rests of the seat, and 10 the back support. 11 designates the reach of the running gear the same being connected with the box 8 and serving as the support of the cross bar at the center thereof.

The several members thus far described broadly considered are old and well known in the art.

The seat 5 is constructed of the wooden base block 12, the covering 13, and the stuffing or padding 14. The upper end of the leg 6 has a rearwardly extending limb 15 which forming an elbow therewith is disposed flat against the underside of the block 12 and secured thereto by the bolts 16 which depending from the seat are passed through registering openings in said limbs, said openings being spaced in accordance with the positions of said bolts, the latter being provided with tightening nuts 17, thus firmly sustaining the seat on said elbow and consequently on the running gear of the tricycle.

It will be seen in the drawings that the seat in Figs. 1 and 2 occupies its rearmost position, but if it is required to set it farther to the front as in Fig. 3 so as to be adjusted to the requirements of the rider relatively to the pedals of the velocipede, the nuts 17 are loosened and removed, and the seat displaced from the limb 15, after which the seat is moved forwardly to the desired extent, and again imposed on the limb 15, when the relative bolts 16 are fitted in the corresponding openings in the limb 15. The nuts are applied and tightened, and so the seat is sustained in its new position.

Attention is drawn to the fact that the seat is provided with a plurality of bolts respectively at the front, rear and central portions of the seat, and said bolts are intended to remain fixtures of the seat. The openings in the limb 15 may receive the front and central bolts, the rear bolt being out of service but remaining on the seat, as in Figs. 1 and 2, or the central and rear bolts, the front bolt being out of service but remaining on the seat, as in Fig. 3, but if desired additional bolts may be provided on the seat so as to adjust the latter intermediate of those shown in said Figs. 2 and 3, the adjustment of the seat being due in all cases to said limb being interchangeable with the coöperating bolts. In either case the limb does not project forward or rearward of the underside of the seat whereby it is comparatively concealed from view, and its length is less than that of the portion of the seat with which it is connectible whereby it provides a firm and ample support for the seat whether in the forward or rearward adjusted position in which it may be set.

The leg 6 being resilient provides the spring for the seat.

Having thus described my invention what I claim as new and desire to secure by Letters Patent, is:—

1. A seat for a tricycle, or like vehicle, having depending therefrom a plurality of bolts, a leg provided with a horizontally-extending limb, said leg being connectible with the running gear of the tricycle, and said limb having therein a plurality of openings which are spaced in accordance with said bolts, whereby the seat is adjustable in forward and rearward directions on said leg and secured thereto.

2. A seat for a tricycle or like vehicle, an angular leg adapted to be supported on the running gear of the vehicle, said leg having a horizontal limb adapted to have said seat imposed thereon, and interchangeable connections for said seat and limb composed of a plurality of bolts fitted in said seat, the latter having therein a plurality of openings adapted to receive said bolts.

3. A seat for a tricycle or like vehicle, an angular leg adapted to be supported on the running gear of the vehicle, said leg having a horizontal limb adapted to have said seat imposed thereon, and interchangeable connections for said seat and limb composed of a plurality of bolts fitted in said seat, the latter having therein a plurality of openings adapted to receive said bolts, said limb being of less length than the portion of the seat with which it is adjustably connectible in forward and rearward directions.

RICHARD G. LEDIG.

Witnesses:
MARGARET HEINRICH,
A. E. PARKER.

Copies of this patent may be obtained for five cents each, by addressing the "Commissioner of Patents, Washington, D. C."